United States Patent [19]

Dasher et al.

[11] Patent Number: 5,046,015

[45] Date of Patent: Sep. 3, 1991

[54] ELECTRONIC LAYOUT SYSTEM

[76] Inventors: Theodore E. Dasher, 1220 33rd St. S., Birmingham, Ala. 35205; Lowell T. Wood, 3607 Queenstown Rd., Trussville, Ala. 35173; Theodore E. Dasher, Jr., 122 33rd St., Birmingham, all of Ala. 35205

[21] Appl. No.: 423,773

[22] Filed: Oct. 18, 1989

[51] Int. Cl.[5] ............................................. G06F 15/46
[52] U.S. Cl. .................................. 364/474.09; 29/703; 29/720
[58] Field of Search .................. 364/474.09; 83/520, 83/526.26; 29/703, 720

[56] References Cited

U.S. PATENT DOCUMENTS

| 3,623,066 | 11/1971 | Norris | 29/720 |
| 4,462,155 | 7/1984 | Brunelle et al. | 29/720 |
| 4,885,967 | 12/1989 | Bell et al. | 83/520 |
| 4,951,385 | 8/1990 | DeSanto | 29/720 |

FOREIGN PATENT DOCUMENTS 0200064  3/1983  Netherlands ..................... 29/703

Primary Examiner—Jerry Smith
Assistant Examiner—Laura Brutman
Attorney, Agent, or Firm—Jennings, Carter, Thompson & Veal

[57] ABSTRACT

An electronic layout system for use with a fabrication table utilizes a plurality of visible display elements mounted on display modules which are linked to a host computer to facilitate the assembly of panels for the panelized or modular production of housing. The display modules are mounted on the fabrication table and in accordance with commands transmitted from the computer, the visible display elements form a coded image of the various types of structural members in a panel as well as their longitudinal and lateral positions within the panel. An operator is able to align the specific structural member with its coded image and assemble the panel on the table, then he may continue production of the same panel or select a new panel.

30 Claims, 7 Drawing Sheets

ELECTRONIC LAYOUT SYSTEM

FIELD OF THE INVENTION

The present invention relates generally to the construction of frame structures for buildings. In particular, the present invention relates to the assembly of individual and sequential building components or panels used in the panelized or modular construction of frame structures. More particularly, the present invention relates to an apparatus, used in conjunction with a fabrication table, that automatically locates the position of individual structural members on the panels or building components. The invention further specifies the type of structural member to be used and its orientation if the component is not symmetrical in any of its three axis.

BACKGROUND OF THE INVENTION

In the panelized and modular construction industry the assembly of panels and building components of the frame of a building is performed in a shop. The panels are then transported from the shop to the job site where they are used in the construction of the building. In panelized construction, laborers assemble groups of the cooperative panels for shipment to a job site. In modular construction, laborers assemble the frame structure room by room for shipment.

The present construction of individual panels and other building components is a labor-intensive operation requiring both semi-skilled and relatively unskilled labor. This operation typically requires the laborers to physically and mentally convert the blueprint measurements by using a steel tape measuring device, thus producing a prototype of the particular panel to be constructed for the building. This step in the production of the panels and building components, sometimes referred to as lathing, is time-consuming. The step of physically converting the measurements into a pattern or lath provides room for human error that is easily overlooked. If the laborers incorrectly measured and constructed the pattern to assemble other similar building components the mistake is magnified. One invention that attempts to automate this step optically enlarges a reduced structural image that has been physically measured to conform to a quadrilateral network that is full scale on an assembly table. The image is projected and enlarged and the nodes of the quadrilateral network of the image are superimposed on the nodes of the quadrilateral network on the assembly table. This step also contains the possibility of human error. More specifically, error may exist in the physical measuring and calculating of the positions of individual structural members used in the assembly of the panel or other building component. Any mistake made during this stage affects the quality of the end product, or possibly a builder's liability to a purchaser.

SUMMARY OF THE INVENTION

It is the object of the present invention to facilitate the production of panels or building components used in the panelized or modular construction of building frames by automating the positioning of individual structural members on the subsequent panels or similar building components. The above mentioned apparatus further designates the specific type of structural member used and its orientation if applicable in the assembly of the building's components. Thus, the elimination of the step of physically converting blueprint measurements to assemble a panel reduces the possibility of human error in the construction of panels or similar building components.

Each of these objects is achieved in the present invention through the use of a plurality of visible linear arrays to display a coded image that locates and specifies the individual structural members used for construction of a panel or building component. These visible arrays are comprised of display modules which are made of linear adjacent submodules, each having a plurality of individual light emitting diodes or liquid crystal display elements. Each submodule is further implemented with a microprocessor subsystem having a programmable read only memory and a random access memory. This microprocessor communicates with the individual light emitting diodes, thus illuminating or extinguishing each diode according to command. Any combination of the light emitting diodes may be lit by the proper command received from a host computer. The host computer includes a memory device wherein the architectural specification for a selected building or structure is represented by a set of addressable stored data, with each panel or component of the structure represented by a subset of data. The data representative of panel components is available for the transmission from said host computer to the visible arrays for display to facilitate positioning or orientation of the required structural members in each panel. The computer uses the design data of the panel and calculates the requirements for and the position of the individual structural members of the orientation panel. The visible display is capable of showing the longitudinal and lateral position and type of individual structural member to be placed at a given location of a panel or building component.

BRIEF DESCRIPTION OF THE DRAWINGS

Apparatus embodying features of the invention are depicted in the accompanying drawings which form a portion of this disclosure and wherein.

DESCRIPTION OF THE PREFERRED EMBODIMENT

Figure 1:
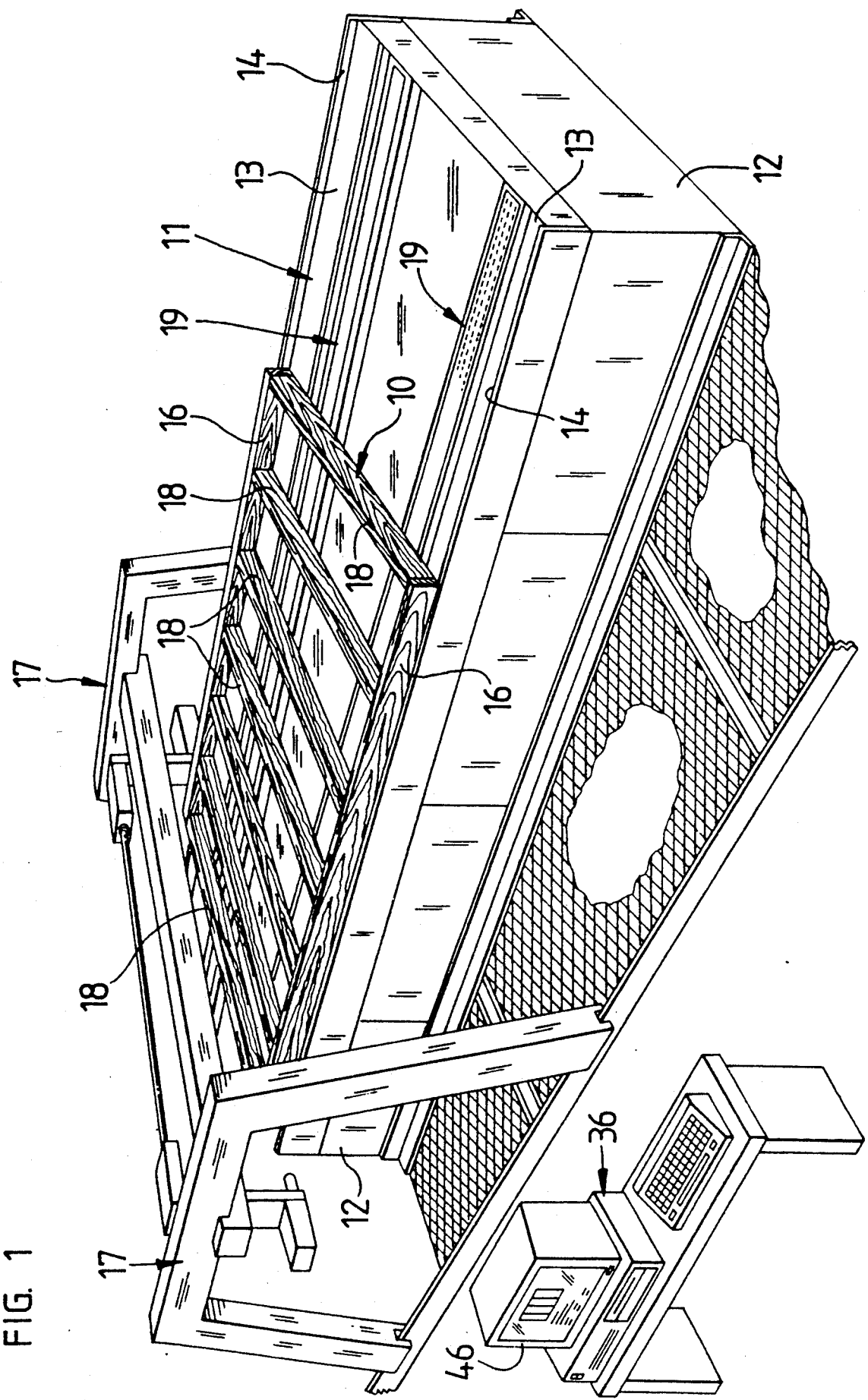
FIG. 1 is a perspective view of a fabrication table with a top and bottom display module and host computer of the invention incorporated therein.
Figure 2:
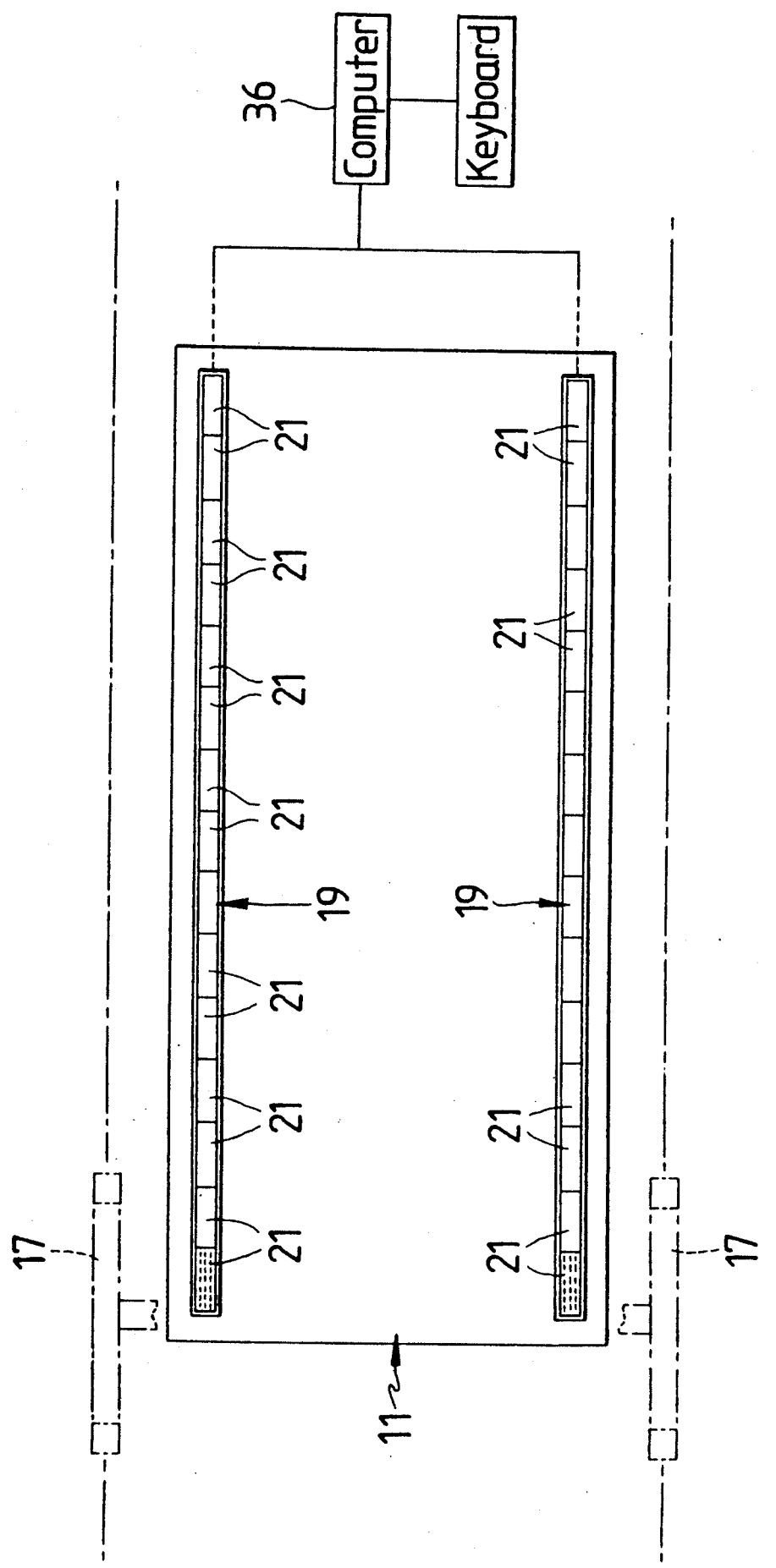
FIG. 2 is a partial plan view of the invention incorporated with the fabrication table as shown in FIG. 1.

Referring to the drawings for a more complete understanding of my invention, it will be appreciated from FIGS. 1 and 2 that the apparatus is to be utilized with a fabrication table 11 used in the production of panels 10 in the panelized and modular production of housing. Such fabrication tables 11 have a lower frame member 12 having a pair of lateral support members 13 and stops 14 abutting the plate members 16 of a panel 10 and holding the plate member 16 in spaced relation. The fabrication table 11 also has a frame structure 17 movable longitudinally along the fabrication table 11 for use in fastening various structure members 18 to the plate members 16. It should be understood any fabrication table may be used with my apparatus and it need not be the complicated table 11 shown in FIG. 1, but may be a simple wooden table where a plate 16 and various type structural members 18 are placed thereon and manually secured to each other. The important thing to be realized is that my apparatus is to be utilized with such a fabrication table 11 to facilitate the assembly of various panels 10, building components or various subcomponents thereof, and the fabrication table 11 acts as a support for the panels 10 and structural members 18, holding them in spaced relation for their assembly. The most basic embodiment of my invention is shown in FIG. 1 as a top and bottom display module 19 mounted within the confines of the lateral support members 13 and extending longitudinally within the fabrication table 11 in spaced relation to one another. The display modules 19 will be positioned 16-18 inches inward from the support members 13, and therefore separated by a distance of four to six feet. The four to six foot space relation is sufficient for panels eight feet in height, but the lateral support members 13 and stop member 14 may be adjustable to accommodate panels with a height of ten feet or taller. For such a case, display modules 19 may be mounted to the assembly table so they too may be adjustable to accommodate the taller panels. The display modules 19 may be any desired length sufficient to display the position of all the structural members 18 or plate members 16 necessary for the assembly of a particular panel 10. The standard lengths of the panels are 16 to 20 feet but the display modules could be made to accommodate panels 60 feet in length.

Figure 3:
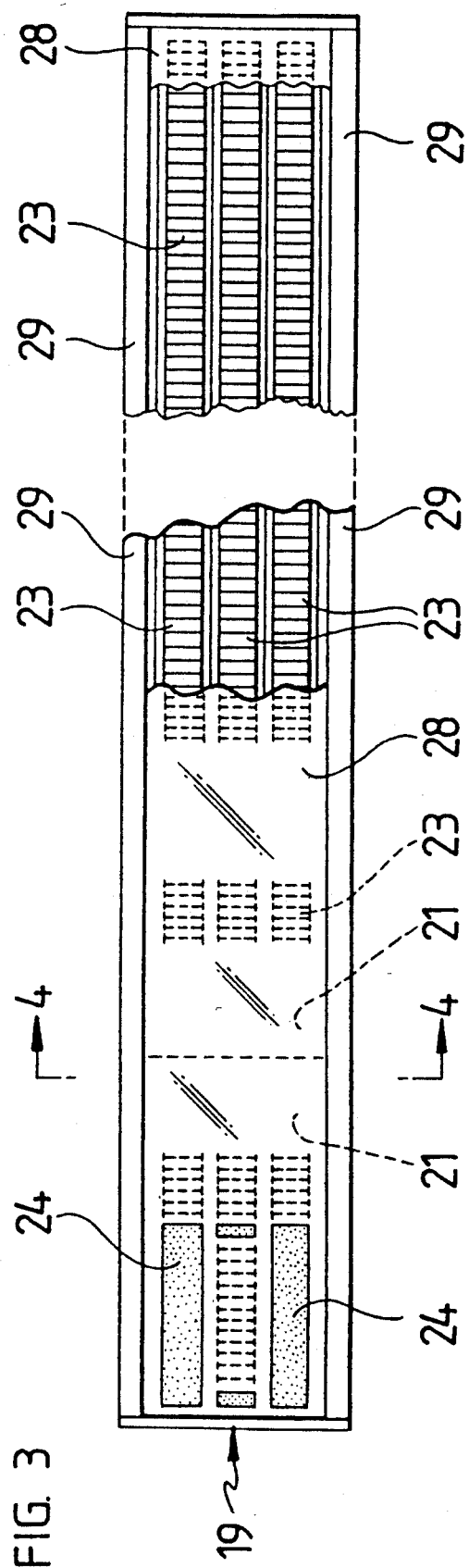
FIG. 3 is a partial plan view of an individual submodule having a coded image illuminated therein.
Figure 4:
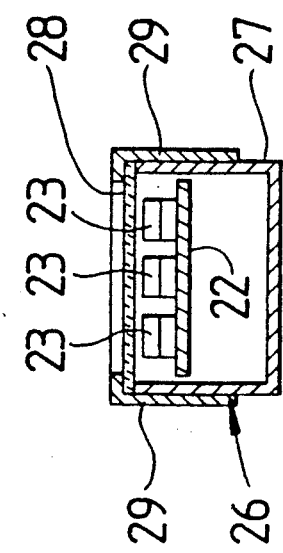
FIG. 4 is a cross-sectional view along line 4—4 of FIG. 3.

As shown in FIGS. 2, 3 and 4, the display module 19 is a linear series of adjacent submodules 21. Each submodule 21 contains a circuit board 22 with a plurality of light emitting diodes (LED) 23 or Liquid Crystal Display Elements (LCD) thereon. Each LED 23 is mounted on approximately 0.1 inch centers, thus the system displays the position of a structural member 18 or the distance between points to within approximately +/−0.1 inch. If smaller LEDs 23 are used they may be spaced in closer increments thus increasing the accuracy of the distance between points. The plurality of rows of LEDs 23 may be used so the LEDs 23 may be illuminated or extinguished in combination to display predetermined coded images 24 indicating the longitudinal or lateral positions of structural members 18 within the panel 10 and the type of structural member 18 to be secured to the plate or structural member already secured to the panel 10. The entire display module 19 is mounted within an enclosed housing 26 of sufficient strength to protect the display module 19 from damage while panels 10 are assembled on the table 11. Note that reference to LED's 23 is intended to include the alternate use of LCD's or other discrete electrically actuated indicators.

As shown in FIGS. 3 and 4, the housing includes a U-shaped channel member 27 having a cover 28 extending across its top. The cover 28 is made from a colored transparent material which allows the operator a clear view of the coded image 24 to enable the operator to accurately position and secure the panel 10 and structural members 18 on the fabrication table 11. The cover 28 is secured to the base member 27 by two L-shaped locking members 29. The display modules 19 are mounted on the fabrication table 11 in FIG. 1 with the cover 28 facing upward and either flush with lateral support members 13 or slightly recessed in relation thereto, providing the operator with a clear view of the coded display image 24 as well as allowing him to accurately align plate members 16 and various structural members 18 above the coded display image 24 as shown in FIGS. 1 and 7.

Figure 9:
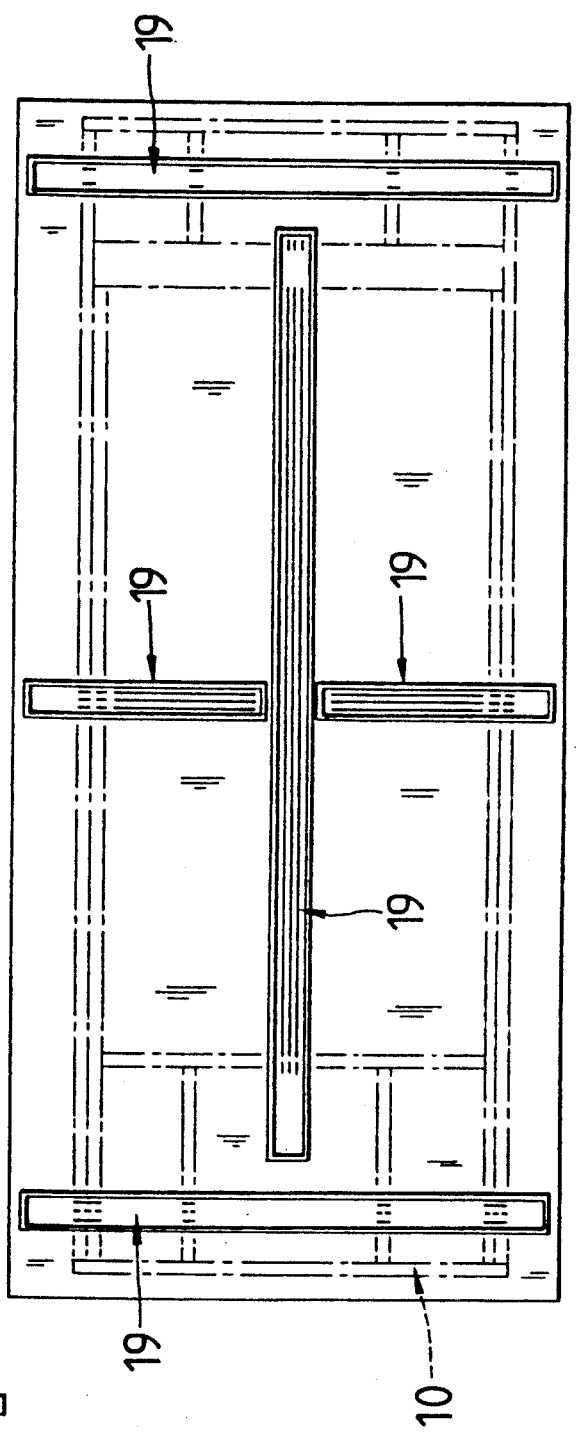
FIG. 9 is a partial plan view of an array of display implied modules arranged to locate all the components contained in a door or window assembly.
Figure 7:
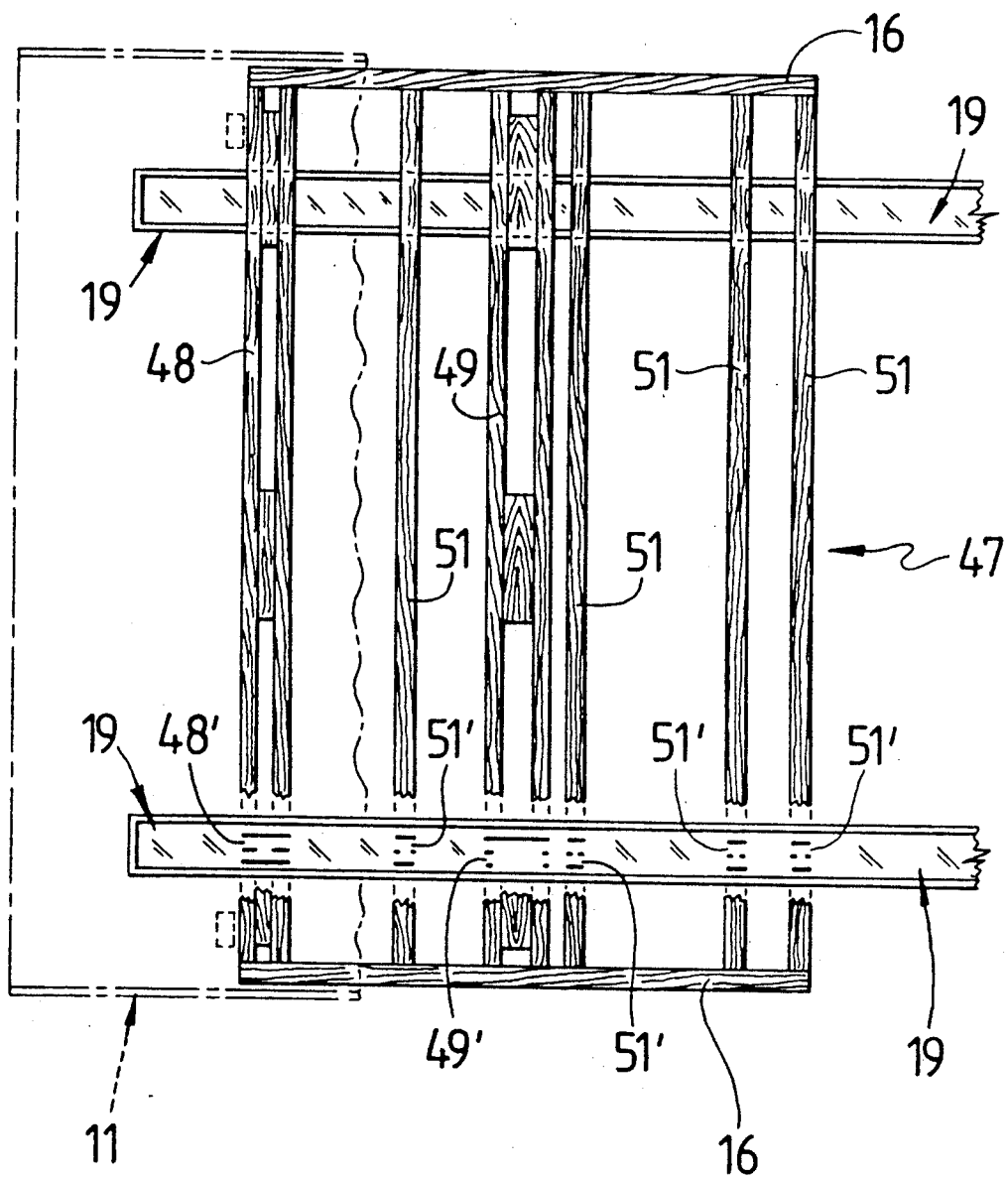
FIG. 7 is a partial plan view of the display modules displaying the data represented in FIG. 6.

In the basic embodiment shown in FIGS. 1, 2 and 7 the top and bottom display modules 19 provide coded images 24 for the longitudinal positioning of the vertical structural members 18 in relation to the plate members 16. The versatility of the apparatus is enhanced by adding a plurality of display modules 19 laterally disposed to the top and bottom display modules, as shown in FIG. 9. The apparatus shown in FIG. 9 would be used to pre-assemble pre-cut pieces into door and window sub-assemblies. The top and bottom display modules 19 would locate header and sill cripples and indicate width and height of the openings as well as header depth and sill depth.

Figure 8:
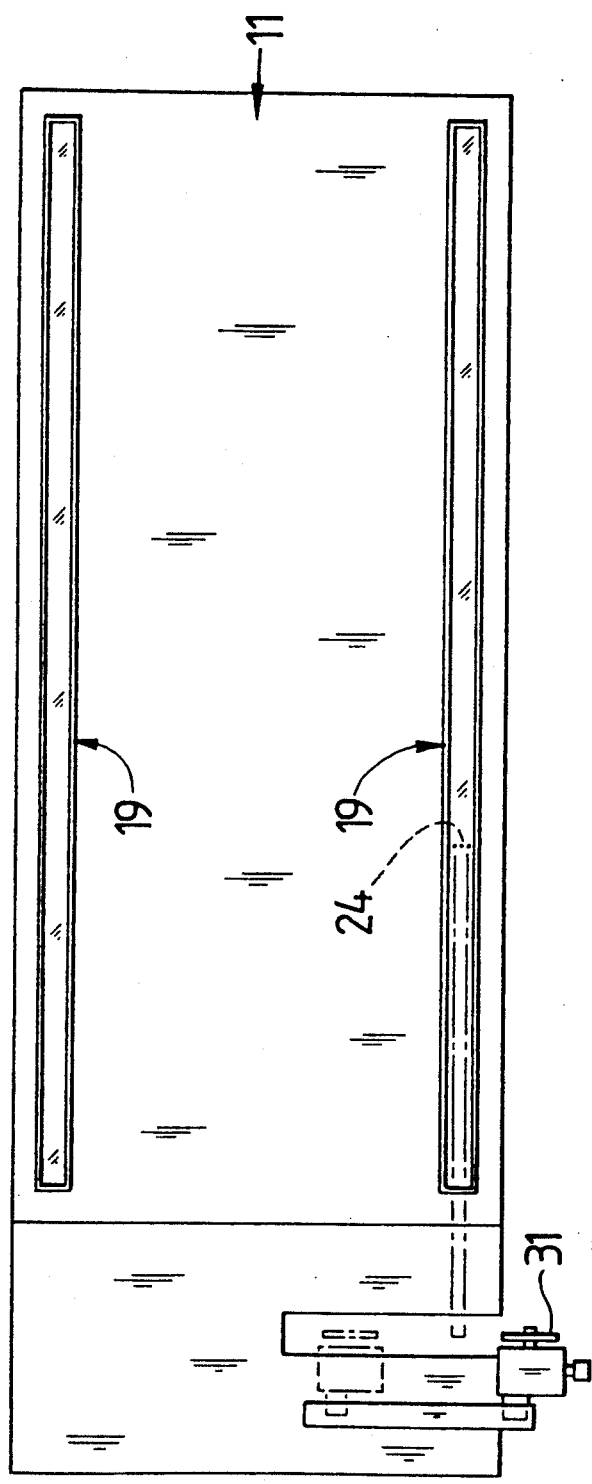
FIG. 8 is a partial plan view of a top and bottom display module with a saw mounted transversely thereto.

Yet another embodiment of the invention is shown in FIG. 8, wherein a cut-off saw 31 may be mounted transversely to one end of the top or bottom display module 19. In this case, the displayed coded message 24 of the top or bottom display module 19 serves as an indicator for the desired length of a plate or structural member in relation to the saw blade. This embodiment allows an operator to cut structural members or plates to be used for the day's production of panels. It is understood my invention includes any combination of any number of LED's 23 and display modules 19. The important feature is that a plurality of visible LED's or LCD's are utilized to display coded images representative of various type structural members to be secured within a panel, thus facilitating the assembly of panels used in the panelized or modular construction of housing.

Figure 5:
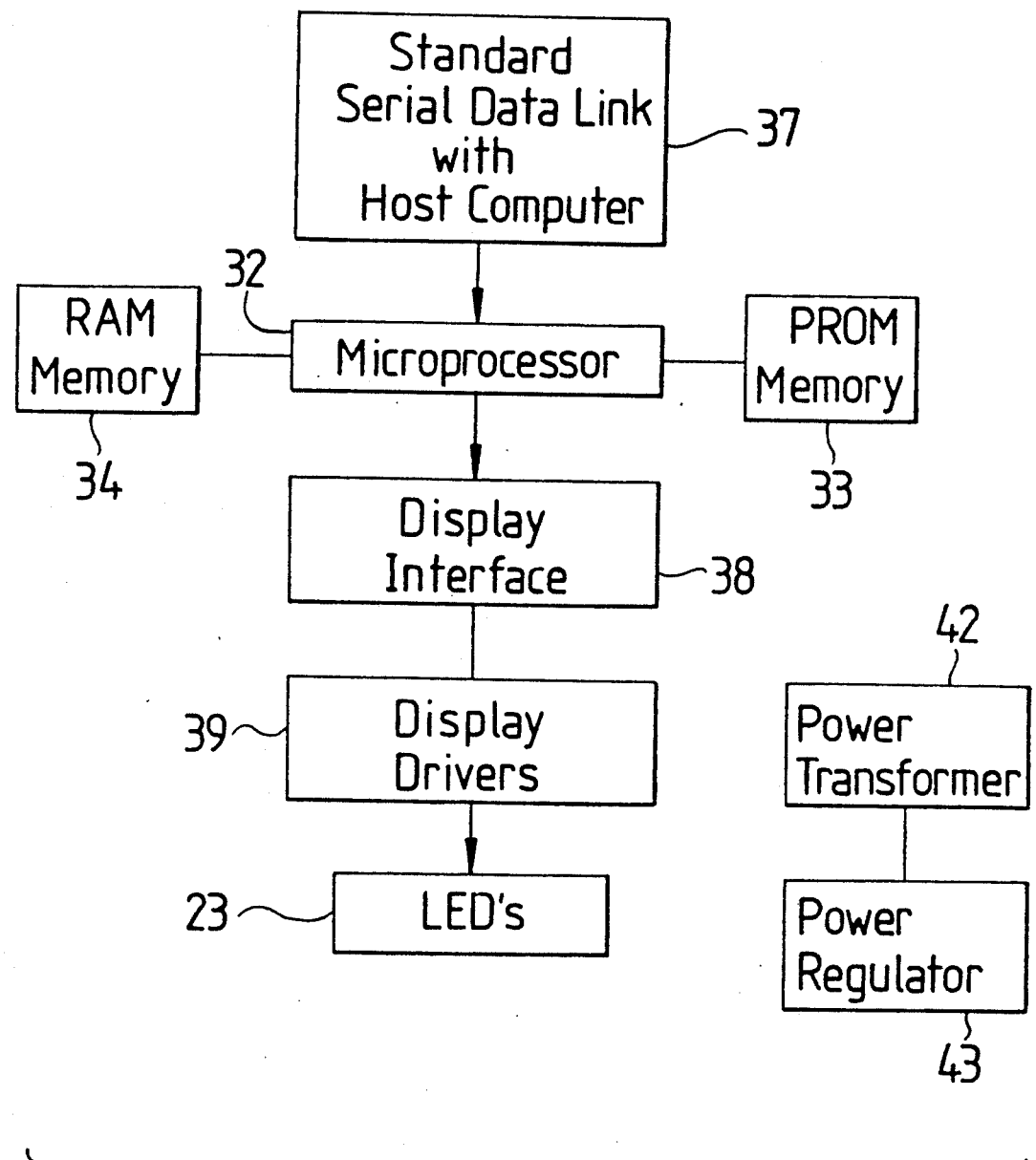
FIG. 5 is a block diagram of the communication system in each submodule.

As mentioned above, the display modules 19 are comprised of submodules 21. Each submodule 21 is fully implemented with a microprocessor 32 that is equipped with programmable read only memory 33 and random access memory 34 as shown in the block diagram in FIG. 5. As shown in FIG. 1, the apparatus further includes a host computer 36 that could be any programmable computer capable of storing an accessible set of data representing the architectural specifications of a building with an accessible subset of data representing the panels which make up the buildings. The host computer 36 communicates to the display module 19 in each microprocessor 32 of each submodule 21. The communication between the microprocessors 32 and the host computer 36 is a standard implementation of serial data link 37. The interface between the microprocessor 32 and the plurality of LEDs 23 mounted on the submodule 21, utilizes display interface 38 and driver 39 to communicate with each of the individual LEDs 23 mounted on the submodule 21. The interface 38 and driver 39 further provide the ability to scan the diodes to regulate the voltage and current applied to each LED 23. Thus the communication system from the host computer to each microprocessor then to each individual LED allows the microprocessor to manipulate and translate data transmitted from the host computer to the visibe array so that the translated data is relayed as discrete signals to the individual LEDs. The LEDs 23 are illuminated or extinguished in combination to display a coded image 24 of a chosen panel 10.

Figure 6:
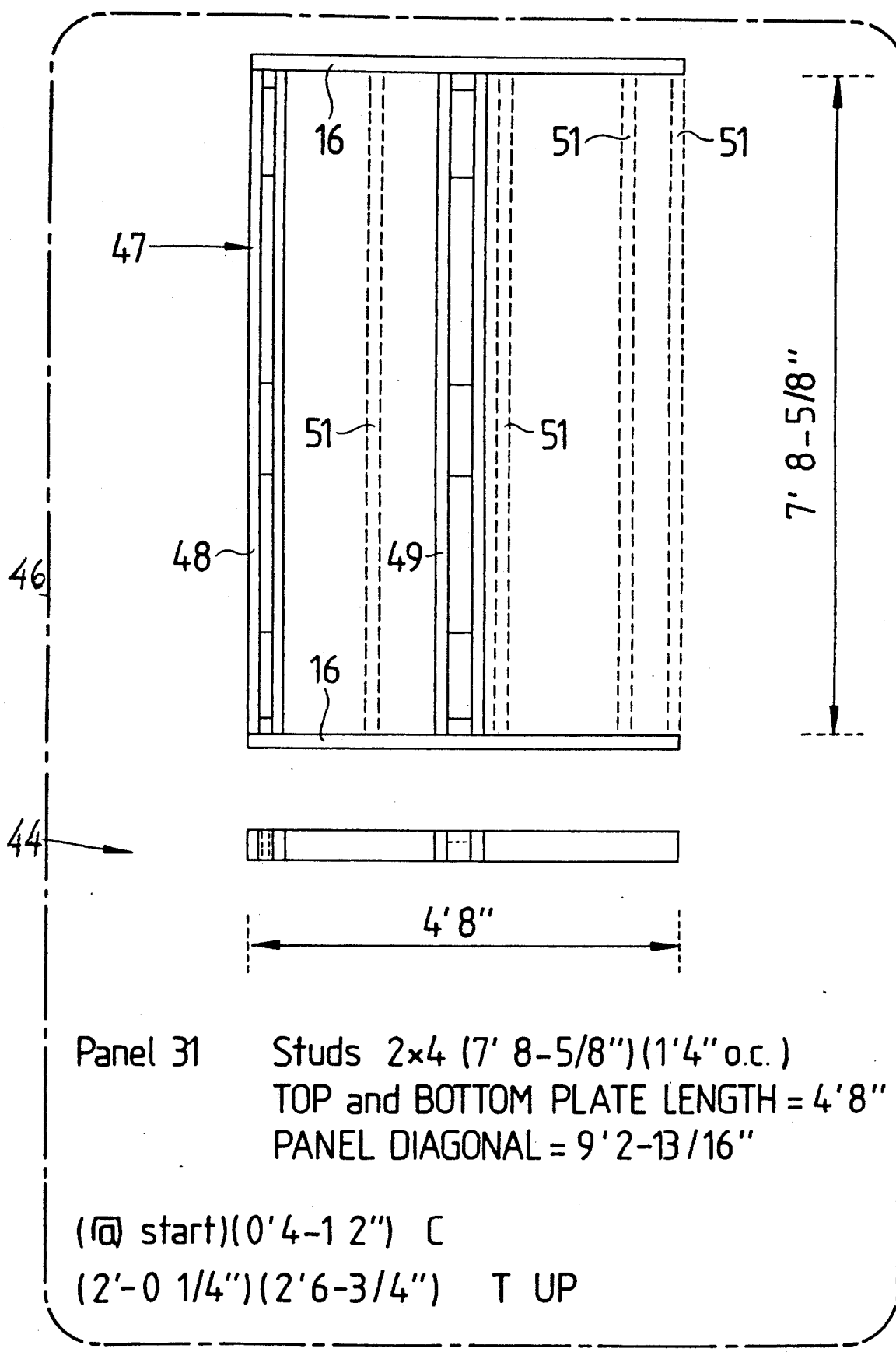
FIG. 6 is a partial pictorial view of a display screen of the host computer with data representative of a prefabricated subcomponent in accordance with my invention.

My invention is not limited to the specific data links mentioned above, but includes any communication system that relays discrete signals to the LEDs resulting in the chosen coded image of a chosen panel. The power to the electronic layout system is provided by a standard linear power supply which is operated from 120 v AC or 240 v AC, 60 Hz power. The incoming power is converted to low voltage via a transformer 42 and converted to usable DC voltage by the regulator section 43. As illustrated in FIGS. 6 and 7, when the operator needs to assemble a particular type panel he accesses the data base of the host computer 36. The host computer 36 may display the relevant data 44 on the computer screen 46 as in FIG. 6. The host computer then uses the design data representing the panel or building components and calculates the requirements for and the positions of the various types of structural members. In FIGS. 6 and 7, a chosen panel 47 includes top and bottom plates 16, 4'8" in length secured to a corner component 48, 4½" wide, and a T-connection 49, 6½" wide. The panel starts at the corner 48 and extends 4'8" with a 6½" wide T-connection 49 beginning 2'¼" from the starting point. The panel 47 has a diagonal dimension of 9'2 13/16". The host computer reads the above-mentioned data, then calculates the location and requirements of the various structural members of a partial panel, as well as distinguishing the type of member in the panel. In FIG. 6, the computer has read the data and determined that four studs 51, 7'8⅝" tall, must be secured to the top and bottom plates 16 relative to the corner 48 and T connection 49 in the designated areas. The host computer relays this entire subset of data representing this particular panel to each microprocessor of each submodule. Each microprocessor manipulates and translates the data and relays discrete signals to its individual LEDs which are illuminated and extinguished in combination with each other to display a series of coded images on the top and bottom display modules 19 representative of the particular panel 47, as demonstrated in FIG. 7. Each coded image 24 is representative of a particular structural member 18 and its longitudinal or lateral position within the panel. The corner 48 is represented by an image 48' different from the image 49' representative of the T connection 49.

Upon viewing the coded images the operator places the prefabricated corner 48 on the fabrication table 11, as in FIGS. 1 and 7, aligning the corner connection 48 and the T connection 49 with their respective coded images 48' and 49'. He also aligns the four studs 51 with their respective coded images 51' and secures them to the top and bottom plate members 21. Following the assembly of a panel, the computer chooses either to continue assembling additional ones of the same panel or to move to another panel in the sequence of panels needed to manufacture a building.

As mentioned previously, the host computer stores the accessible set of data representing the architectural design of a building with the panels or subcomponents represented as a subset of data. The data further includes the sequence of steps in which the panels or groups of the same panels are to be assembled in the shop. The computer also contains the capability of counting the number and type panels that have actually been assembled, as well as those intended to be assembled. Thus as a panel or group of panels is completed the computer can automatically choose the next panel or group of panels to be manufactured.

This type of operational system permits the operator to cut, prior to production, all the structural members necessary for production and arrange them in the sequential order the computer will display for production. Then an unskilled laborer, having the sequentially arranged members 18 stacked adjacent to the table, may align the members 18 with the displayed coded images 24. This sequential operation may be enhanced further by having the computer display the coded images in the order in which the panels will be raised on the job site. Thus as the panels are assembled and stacked in bundles and then taken to the job site, the first panel taken off the truck is the first to be raised in the construction of a building and each succeeding panel is next for use at the job site. The host computer automatically accesses the data representing the panels, however, the host computer may also allow the operator to manually select a panel of his choice via the keyboard. Thus we have provided an extremely versatile, accurate, and labor-saving innovation which, if used properly, can save time, material and money in the construction industry.

While I have shown my invention in various forms, it will be obvious to those skilled in the art that it is not so limited but is susceptible of various changes and modifications without departing from the spirit thereof.

What I claim is:

1. An apparatus for projecting a full scale structural image for use in the automated production of building components on a component layout table comprising:
   (a) a plurality of visible linear arrays;
   (b) means for generating a plural signals for display on said linear array to identify the position and type of selected structural members.

2. An apparatus as defined in claim 1 wherein said plurality of visible linear arrays includes top and bottom display modules for locating members and subcomponents.

3. An apparatus as defined in claim 2 wherein said top and bottom display modules each include at least three rows of discrete electrically actuated indicators.

4. An apparatus as defined in claim 3 wherein said discrete electrically actuated indicators are light emitting diodes.

5. An apparatus as defined in claim 3 wherein said discrete electrically actuated indicators are liquid crystal display elements.

6. An apparatus as defined in claim 3 wherein said discrete electrically actuated indicators are spaced to provide incremental indication at a separation of about 0.1".

7. An apparatus as defined in claim 6 wherein said top and bottom display modules further comprise a series of adjacent longitudinally aligned individual submodules.

8. An apparatus as defined in claim 3 wherein said generating means provides discrete signals that actuate each discrete one of said plurality of electrically actuated indicators to indicate the longitudinal position of structural members.

9. An apparatus as in claim 8 wherein said actuated indicators form a coded indication of the longitudinal position and orientation of each structural member.

10. Apparatus as defined in claim 2 wherein each display module includes a plurality of submodules with each submodule thereof comprising:
(a) a plurality of discrete electrically actuated indicators arranged in at least three longitudinal rows;
(b) a programmable microprocessor programmed to control the illumination of each indicator of said plurality of visible linear arrays in accordance with signals received from said generating means.

11. An apparatus as defined in claim 1 wherein said plurality of visible linear arrays includes:
(a) top and bottom display modules used to longitudinally position and orient vertical members; and
(b) laterally spaced display modules used to position and orient horizontal structural members.

12. An apparatus as defined in claim 11 wherein said top, bottom and lateral display modules each include at least three rows of discrete electrically actuated indicators.

13. An apparatus as defined in claim 12 wherein said discrete electrically actuated indicators are spaced to provide incremental indicators at separations of about 0.1".

14. An apparatus as defined in claim 13 wherein said top, bottom and lateral display modules each comprise a series of adjacent longitudinally aligned individual submodules.

15. An apparatus as defined in claim 10 wherein said generating means provides discrete signals that actuate selected indicators in each row of said plurality of indicators to indicate the longitudinal position of structural members.

16. An apparatus as defined in claim 15 wherein said actuated discrete electrically actuated indicators form a coded indication of the positioning of each structural member.

17. Apparatus as defined in claim 11 wherein each display module includes a plurality of submodules with each submodule thereof comprising:
(a) a plurality of discrete electrically actuated indicators arranged in at least three longitudinal rows;
b) a programmable microprocessor programmed to control the illumination of each indicator of said plurality of indicator in accordance with signals received from said generating means.

18. An apparatus as defined in claim 17 wherein said discrete electrically actuated indicators are light emitting diodes.

19. An apparatus as defined in claim 17 wherein said discrete electrically actuated indicators are liquid crystal display elements.

20. An apparatus as defined in claim further including a saw positioned at one end of one of the visible linear arrays said saw being mounted for transverse movement relative to the end of said array.

21. An apparatus as defined in claim 20 wherein said linear arrays comprise at least two rows of discrete electrically actuated indicators.

22. An apparatus as defined in claim 21 wherein said discrete electrically actuated indicators are light emitting diodes.

23. An apparatus as defined in claim 21 wherein said discrete electrically actuated indicators are liquid crystal display elements.

24. An apparatus as defined in claim 21 wherein said discrete electrically actuated indicators are spaced to provide incremental indication at a separation of about 0.1".

25. An apparatus as defined in claim 21 wherein said linear arrays further comprise a series of longitudinally aligned adjacent individual modules.

26. An apparatus as defined in claim 25 wherein said generating means provides discrete signals that actuate selected indicators on each row of said plurality of discrete electrically actuated indicators to indicate the appropriate length of a structural member such that a first end of said member may be positioned at the selected indicator to provide an accurate displacement of said one end from said saw.

27. An apparatus as defined in claim 26 wherein said actuated indicators form a coded indication of the length and cut of each structural member.

28. An apparatus as defined in claim 1 wherein said generating means comprises:
(a) a programmable host computer; and
(b) means for communicating between said light visible linear array and said programmable host computer including a serial data link.

29. An apparatus as defined in claim 28 wherein said programmable host computer includes a memory device containing data representative of the individual sequential panels that comprise a final frame structure wherein said data is addressable for display of said data onto the visible linear arrays.

30. An apparatus as defined in claim 29 wherein said data representative of the individual sequential panels includes a start and stop position of the entire panel and the relative location of each structural member within said panel.

* * * * *